(12) United States Patent
Fujii

(10) Patent No.: US 7,336,163 B2
(45) Date of Patent: Feb. 26, 2008

(54) TRANSPONDER STARTUP CONTROL METHOD AND INTERROGATOR FOR TIRE PRESSURE MONITORING SYSTEM

(75) Inventor: Masaki Fujii, Kasugai (JP)

(73) Assignee: OMRON Corporation, Kyoto (JP)

( * ) Notice: Subject to any disclaimer, the term of this patent is extended or adjusted under 35 U.S.C. 154(b) by 171 days.

(21) Appl. No.: 11/027,712

(22) Filed: Dec. 29, 2004

(65) Prior Publication Data

US 2005/0156723 A1 Jul. 21, 2005

(30) Foreign Application Priority Data

Jan. 20, 2004 (JP) ............................. 2004-012343
Aug. 23, 2004 (JP) ............................. 2004-242203

(51) Int. Cl.
*B60C 1/00* (2006.01)
(52) U.S. Cl. ............... 340/447; 340/10.31; 340/10.34; 340/10.5
(58) Field of Classification Search ............ 340/572.1, 340/10.1, 10.3, 10.34, 10.5, 10.2, 10.31, 340/10.32, 10.33, 10.51, 10.52
See application file for complete search history.

(56) References Cited

U.S. PATENT DOCUMENTS

| | | | |
|---|---|---|---|
| 6,087,930 A | | 7/2000 | Kulka et al. ................ 340/447 |
| 6,307,473 B1 * | | 10/2001 | Zampini et al. ......... 340/572.1 |
| 6,486,769 B1 * | | 11/2002 | McLean ................... 340/10.32 |
| 6,591,671 B2 * | | 7/2003 | Brown ....................... 73/146.5 |
| 6,600,418 B2 * | | 7/2003 | Francis et al. ........... 340/572.1 |
| 6,639,509 B1 * | | 10/2003 | Martinez .................... 340/10.4 |
| 6,771,169 B1 * | | 8/2004 | Kaminski et al. ........... 340/442 |
| 6,842,121 B1 * | | 1/2005 | Tuttle ....................... 340/693.9 |
| 6,900,721 B1 * | | 5/2005 | Urbas et al. ............. 340/10.51 |
| 6,960,985 B2 * | | 11/2005 | Wuidart ................... 340/10.34 |
| 2005/0231346 A1* | | 10/2005 | Ichinose et al. ............ 340/447 |

* cited by examiner

Primary Examiner—Jeffery Hofsass
Assistant Examiner—Edny Labbees
(74) Attorney, Agent, or Firm—Beyer Weaver LLP (57) ABSTRACT

A passive transponder is started up by receiving an interrogation signal and returning a requested response signal. The startup is controlled by an interrogator using a startup control method by judging presence or absence of a return of the response signal while monotonically increasing transmission power of the interrogation signal from an initial value by an amount which is made smaller stepwise every time presence of the return is judged and maintaining the transmission power, after presence of the return is judged, at its value as of the time when presence of the return was judged.

13 Claims, 9 Drawing Sheets

ST | ID DATA | MODE SETTING DATA | END 9a, 9b, 9c, 9d → 9

*FIG. 11B*

ST | ID DATA | TIRE PRESSURE DATA | TEMPERATURE DATA | RUN DETECTION DATA | ERROR CORRECTION DATA | END 10a, 10b, 10c, 10d, 10e, 10f, 10g → 10

TRANSPONDER STARTUP CONTROL METHOD AND INTERROGATOR FOR TIRE PRESSURE MONITORING SYSTEM

Priority is claimed on Japanese Patent Applications 2004-12343 filed Jan. 20, 2004 and 2004-242203 filed Aug. 23, 2004.

BACKGROUND OF THE INVENTION

This invention relates to a startup control method for a passive transponder adapted to be started up in response to an interrogation signal from an interrogator and to return required data back to the interrogator such as a control method that may be applied to a tire pressure monitoring system (TPMS), and in particular to an interrogator in such a system.

Except when used for a particular purpose, vehicular tires are of an air injection type. Thus, whenever a tire of this kind is set to a wheel and attached to a vehicle, its air pressure must be adjusted appropriately according to the type of the vehicle. An inadequate tire pressure causes not only discomfort to the passenger, a reduction in the travel stability and excessive wears to the tires but also the bursting of the worn-out tire at the time of a travel at a high speed in a worst situation where the air pressure is particularly low.

In general, the tire pressure is measured by pressing a dedicated instrument such as a pressure gauge onto the tire valve but such a method can be used only when the vehicle is stopped and can be done only intentionally. In other words, the tire pressure cannot be monitored constantly. Although the checking of tire pressure may be one of the inspection routines and the aforementioned worst condition may be avoided by following the inspection routines, such routines cannot be expected to be followed all the time.

In view of this situation, a law was passed in the United States to make it mandatory to install a tire pressure alarm system to a vehicle. A substantial market expansion in response to this new law is expected to take place towards the end of 2006 but cooperative efforts have already started among the makers of tires, valves and electronic equipments.

The focus of attention is not on the deflation detection systems (DDSs) which have already been installed to some of the vehicles but the tire pressure monitoring systems (TPMSs). Unlike the DDS adapted to indirectly monitor the tire pressure by making use of outputs from a wheel speed sensor used for an anti-lock brake system (ABS), the TPMS is adapted to monitor all tires individually and directly by providing a sensor unit at the valve portion of each tire and hence is capable of an accurate monitoring even while the vehicle is stopped or parked.

Japanese Patent Publication 9-509488 (corresponding to U.S. Pat. No. 6,087,930) has described a technology of TPMS comprising a transponder provided to each tire of a vehicle and an interrogator attached to the body of the vehicle. The interrogator is a device that interrogates and the transponders are adapted to respond by returning a signal in response to an interrogation from the interrogator. The transponders are each provided with a sensor for detecting the conditions of the corresponding tire, but the conditions of a tire are variables related to the tire which change with time, inclusive basically of the tire pressure and also of the temperature and rotary speed of the tire. Thus, the sensor is primarily an air pressure sensor or a compound sensor including a pressure sensor, a temperature sensor and a rotary motion sensor. The conditions of a tire may also include data related to its production although they are not variable data. In such a situation, a memory recording such data may be included in the sensor or its peripheral circuit part.

In addition to such a sensor, the transponder further includes a signal receiver for receiving interrogation signals transmitted from the interrogator and a signal transmitter for transmitting the sensor data from the sensor in response to the interrogation signal received by the signal receiver. In summary, this is a passive apparatus because it starts up in response to an interrogation signal from the interrogator and is adapted to return a response signal.

The interrogator on the vehicle body is provided with a signal transmitter for transmitting a wireless interrogation signal to the transponder of each tire, a signal receiver for receiving response signals (of sensor data, tire pressure data and other data) returned from the transponders in response to this interrogation signal, and a reporting part for making judgment on the various data contained in these response signals (tire pressure data in particular) received by the signal receiver and reporting the result of such judgment to the vehicle operator.

With a prior art system thus structured, the interrogator can make judgments on abnormal conditions of the individual tires on the basis of the response signals returned from the transponders and report on these judgments to the vehicle operator. In other words, the abnormal conditions of variable data such as tire pressure can be monitored constantly and continuously. It is therefore extremely effective in the prevention of worst situations such as the bursting of tires. Since each of the transponders is of a passive kind, starting up only in response to an interrogation signal appropriately transmitted from the interrogator on the vehicle body, wasteful consumption of the inner batteries of the transponders can be prevented because the operations are stopped when the vehicle is being parked over a long period of time or when a tire is being removed from the vehicle.

There are problems with the prior art system as described above. For example, the number of transponders that are required for each vehicle depends on the number of tires on that vehicle. In the case of a four-wheel vehicle, for example, five transponders will be required inclusive of the one for the spare wheel. In order for the interrogator to receive response signals from so many transponders without having them confusingly mixed together, it is necessary to start up the transponders of the individual tires independently. One of the methods for individual startup will be to include ID data in the interrogation signals from the interrogator and to start up only the transponders with matching ID data. Another method will be to set transmission antennas individually near the transponders for interrogation signals and to transmit the interrogation signals from these transmission antennas in time divisions.

The problem with the former method is that the receivers of all transponders and the circuits for judging the matching of ID data must be always switched on. This means that the power consumption of the transponders becomes large and the internally contained batteries are quickly consumed.

The problem with the latter method is that various adjustments are required such that only one transponder will be inside the cover area of each transmission antenna. These adjustments will include the optimum design for each vehicle type (the optimum design of transmission antennas making pairs with the transponders) and the adjustment of power for each transmission antenna. This results in an increase both in production cost and the work cost. Moreover, even if optimum designs and power adjustments are carried out, power may change due to changes over time and in the environmental conditions of the transmission antennas. Thus, the vehicle will have to be regularly brought to a factory or the like for readjustment of power. This affects the use efficiency of the vehicle adversely.

SUMMARY OF THE INVENTION

It is therefore an object of this invention to provide a transponder startup control method and a tire pressure monitoring system that will not increase the power consumption, will reduce the production and work costs and will not adversely affect the use efficiency of the vehicle.

This invention relates to a startup control method for a passive transponder which is adapted to be started up by receiving an interrogation signal and to return a requested response signal and may be conveniently applicable to an interrogator of a tire pressure monitoring system. The method may be characterized as comprising the steps of judging presence or absence of a return of such a response signal while monotonically increasing transmission power of the interrogation signal from an initial value by an amount which is made smaller stepwise every time presence of the return of a response signal is judged and maintaining the transmission power of the transmission signal, after presence of the return of a response signal is judged, at the value of the transmission power as of the time when presence of this return was judged.

In the above, the term "interrogation signal" is used to indicate a signal for causing the transponder to change its condition to that of being capable of returning a response signal. In what follows, this change in the condition of the transponder is referred to as the startup. It does not matter whether such an interrogation signal should also contain any meaningful data. It may be nothing more than a signal containing only an ordinary carrier wave. The response signal is a signal containing some data (including at least tire pressure data in the case of a transponder for a tire pressure monitoring system) which can be utilized for a purpose by the interrogator.

The judgment as to presence or absence of a response signal may be made based on the level of the response signal or, if the response signal contains error correction data, on whether or not an error has been corrected by using the error correction data.

According to this invention, the transmission power level of the interrogation signal is autonomously set at an optimum level by taking into consideration the positional relationship between the transponder and the interrogator, their transmission and reception capabilities and the actual conditions of wave interference, say, caused by pollution or contaminated conditions.

According to a preferred embodiment of the invention, the method further includes the step of reducing the transmission power of the interrogation signal such that the transmission level can be returned to a lower level after a wave interference condition is removed.

According to a further preferred embodiment of the invention, the initial value of the transmission power of the interrogation signal is treated as a variable and updated with the transmission power as of the time when the return of a response signal was judged. This has the advantage of eliminating the wasteful increase in power and the wait time for the response signal.

By this invention, the transmission power for transmitting the interrogation signal can be optimized without any manual work and thus the production cost and the work cost can be appropriately reduced. Moreover, this optimization of the transmission power level is carried out during the time of actual use. Even where the invention is applied to an interrogator of a tire pressure monitoring system, there is no need to bring the system to a factory or the like and hence the use efficiency of the vehicle to which the system is installed is not adversely affected.

DETAILED DESCRIPTION OF THE INVENTION

The invention is described next with reference to drawings by way of an example applied to a tire pressure monitoring system (TPMS) but it goes without saying that the invention is not limited to such an application. The illustrated system is no more than a representative example of a system including passive transponders and an interrogator, and the invention can be applied to any similar systems.

Figure 1:
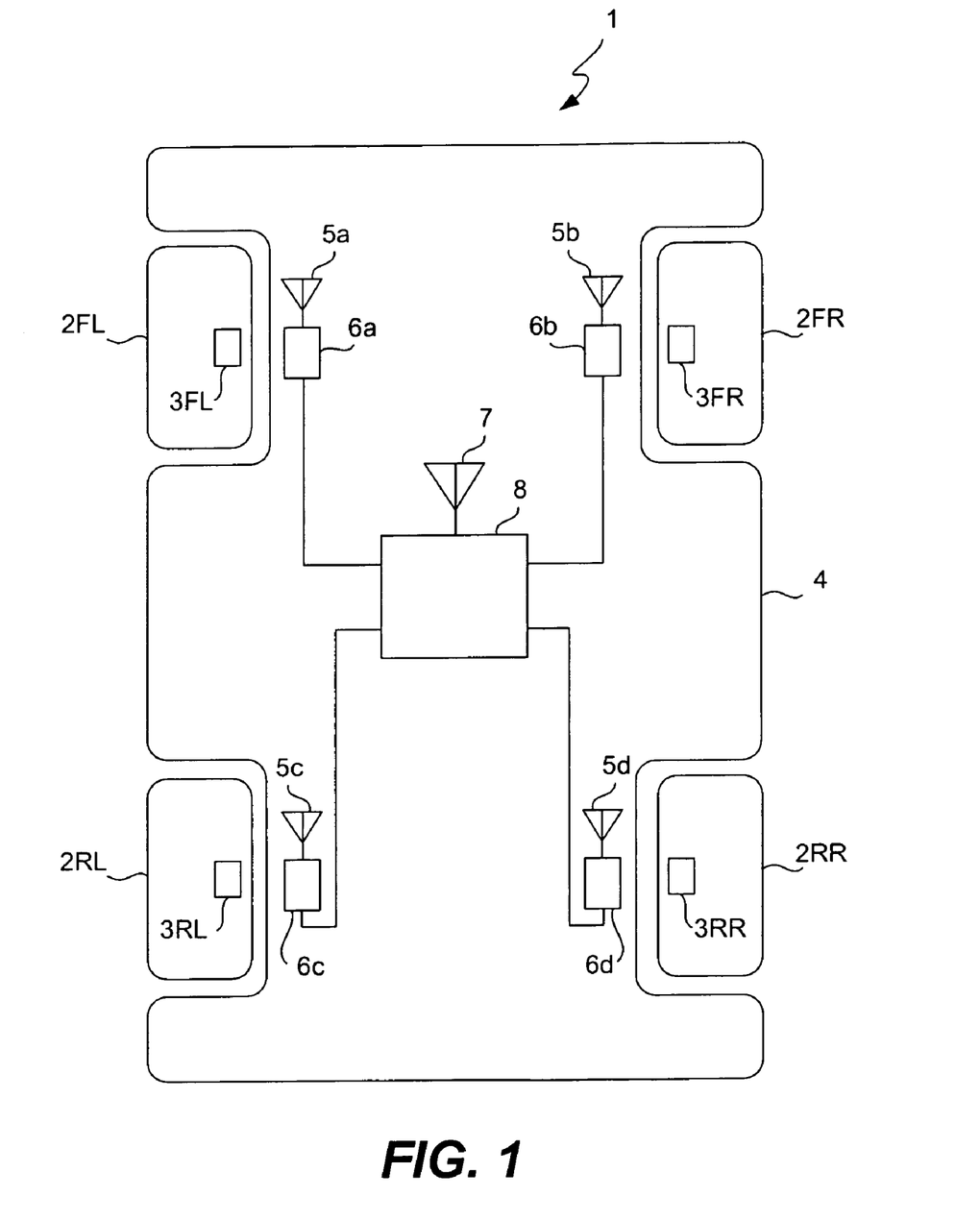
FIG. 1 is a structural diagram of a tire pressure monitoring system.

FIG. 1 shows the structure of a tire pressure monitoring system 1 for a vehicle with four wheels, comprising transponders 3 (transponder 3FL attached to the left-hand front tire 2FL, transponder 3FR attached to the right-hand front tire 2FL, transponder 3RL attached to the left-hand rear tire 2RL and transponder 3RR attached to the right-hand rear tire 2RR), transmission antennas 5a, 5b, 5c and 5d and transmission units 6a, 6b, 6c and 6d attached to the vehicle body 4 at positions respectively close (such as inside the wheel house) to the tires 2 (2FL, 2FR, 2RL and 2RR) and a reception antenna 7 and an interrogator 8 in common which are set at any position on the vehicle body 4.

Although most vehicles carry a spare tire and if its condition must also be monitored, a transponder may be attached to such a spare tire and a transmission antenna and a transmission unit may be set near this spare tire. For the convenience of description, the existence of such a spare tire will be ignored in what follows but it is to be remembered that it is only for the convenience of description.

Figure 2A:
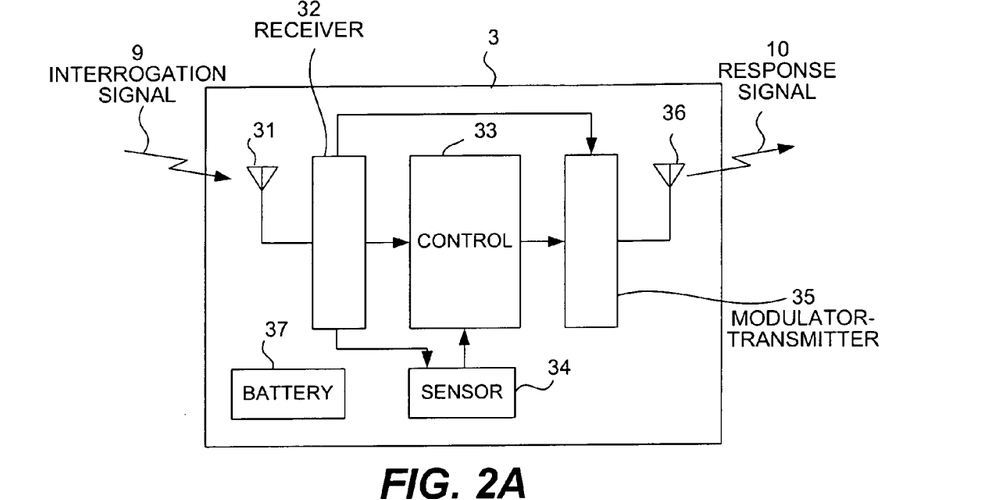
FIG. 2A is a block diagram of a transponder and FIG. 2B is a block diagram of the interrogator shown in FIG. 1.

FIG. 2A is a block diagram of a transponder 3. The transponder 3 is provided with a reception antenna 31 and a receiver part 32 for receiving an interrogation signal 9 within a specified frequency range (to be described below), a control part 33 which starts up in response to the reception of this interrogation signal 9, a sensor part 34, a modulator-transmitter part 35, a transmission antenna 36 for transmitting a response signal 10 modulated by the modulator-transmitter part 35 into another specified frequency range (to be described below) and an internal battery 37 for supplying power to the interrogator 8.

The frequency of the interrogation signal 9 is selected to be sufficiently low such that there is not need to be converted into an intermediate frequency by the receiver part 32. This is such that the consumption of power for the conversion to the intermediate frequency will be obviated and the useful lifetime of the battery will not be uselessly shortened. By contrast, the frequency of the response signal 10 is selected to be sufficiently high because the power required for the transmission can be thereby reduced and the power consumption of the battery 37 can be reduced.

The actual selection of frequency for the interrogation and response signals 9 and 10 must be determined according to the laws of the country. In Japan, the frequency of the interrogation signal 9 may be 125 kHz in the LF band. That of the response signal may be 315 MHz in the UHF band in Japan and in the United States and 430 MHz in Europe.

As explained above, this transponder 3 is of a passive kind. In other words, this transponder 3 is adapted to start up its control part 33, sensor part 34 and modulator-transmitter part 35 and to transmit the response signal 10 from its transmission antenna 36 in response to the reception of the interrogation signal 9 by the reception antenna 31 and the receiver part 32.

In the above, to start up means to place the transponder 3 in an activated condition wherein it is capable of returning a response signal. Explained more in detail, this means that the transponder 3 is activated such that the power from the internal battery 37 is supplied to all parts of the transponder 3 or that the transponder 3 changes its condition from that of waiting to receive an interrogation signal to that of being able to transmit a response signal.

The response signal 10 includes data that represent conditions of each tire. The conditions of a tire include variable data on the tire that may change with the elapse of time, being inclusive basically of the tire pressure and also of the tire temperature, the brake temperature and the tire rotation. Thus, the sensor part 34 is an air pressure sensor or a compound sensor including a pressure sensor, a temperature sensor and a rotary motion sensor.

The control part 33 is for taking in sensor data from the sensor part 34 in response to the received interrogation signal 9, creating a response signal 10 containing such sensor data (to which older sensor data collected and accumulated in the past may be added) as well as individual data such as production data on the tire and ID data, and transmitting the created response signal 10 to the modulator-transmitter part 35. The modulator-transmitter part 35 modulates the received response signal 10, amplifies it and transmits it from the transmission antenna 36.

Figure 2B:
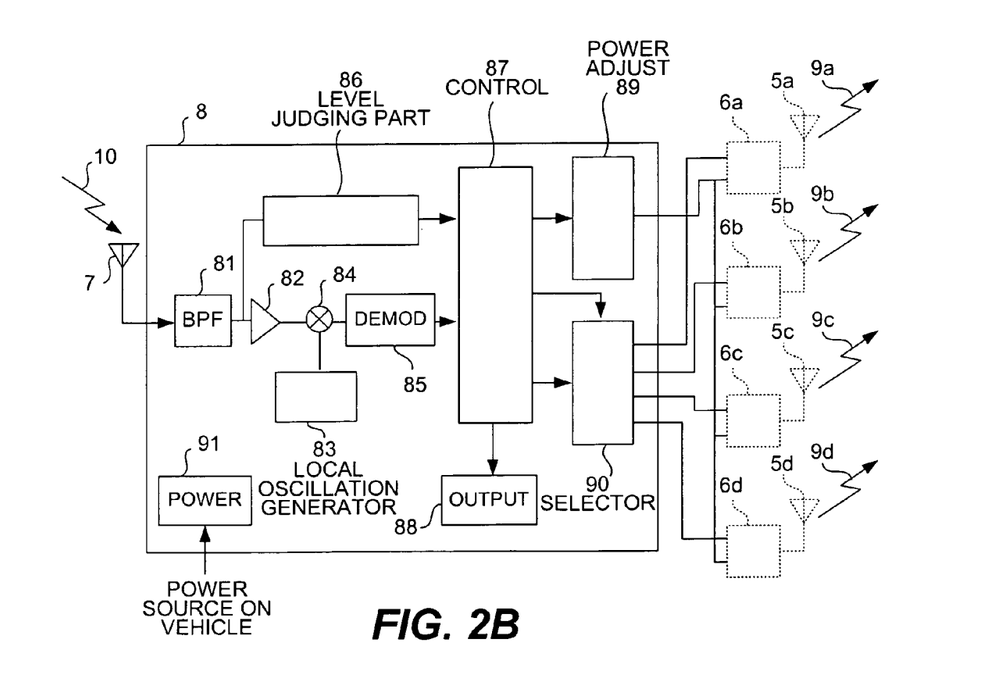

FIG. 2B is a block diagram of the interrogator 8. The interrogator 8 is provided with a bandpass filter (BPF) 81 for extracting a "high-frequency" signal (315 MHz or 430 MHz, for example, as the response signal 10) from a signal received by the common reception antenna 7, an amplifier 82 for amplifying the response signal 10 extracted by the bandpass filter 81, a local oscillation generator 83 for generating a local oscillation signal, a mixer 84 for mixing the response signal 10 amplified by the amplifier 82 and the local oscillation signal to convert into a response signal 10 with an intermediate frequency (intermediate frequency conversion), a demodulator (DEMOD) 85 for demodulating the response signal 10 after the intermediate frequency conversion so as to thereby reproduce the original data (such as the tire pressure data detected by the sensor part 34 of the transponder 3 and the ID data of the transponder 3), a level judging part 86 for judging whether or not the reception level of the response signal 10 after passing through the bandpass filter 81 is over a lowest reception level, a control part 87 for controlling the overall operations of the interrogator 8, an output device 88 for displaying output data from this control part 87 or communicate them to the vehicle operator or the passenger either by an electronic sound or a voice signal, a power adjusting part 89 for varying the transmission power of the transmission units 6a-6d for the transmission antennas 5a-5d individually according to command signals from the control part 87, a selector 90 for sequentially selecting the transmission antennas 5a-5d and the transmission units 6a-6d according to a command signal from this control part 87 and outputting the interrogation signal 9 from the control part 87 to the selected transmission antennas 5a-5d and transmission units 6a-6d, and a power source 91 generating a necessary internal power source voltage for the operations of the interrogator 8. In the above, what is referred to as the interrogation signal 9 includes signals 9a, 9b, 9c and 9d respectively addressed to the aforementioned transponders 3FL, 3FR, 3RL and 3RR that are individually attached to the four tires 2FL, 2FR, 2RL and 2RR.

Figure 3:
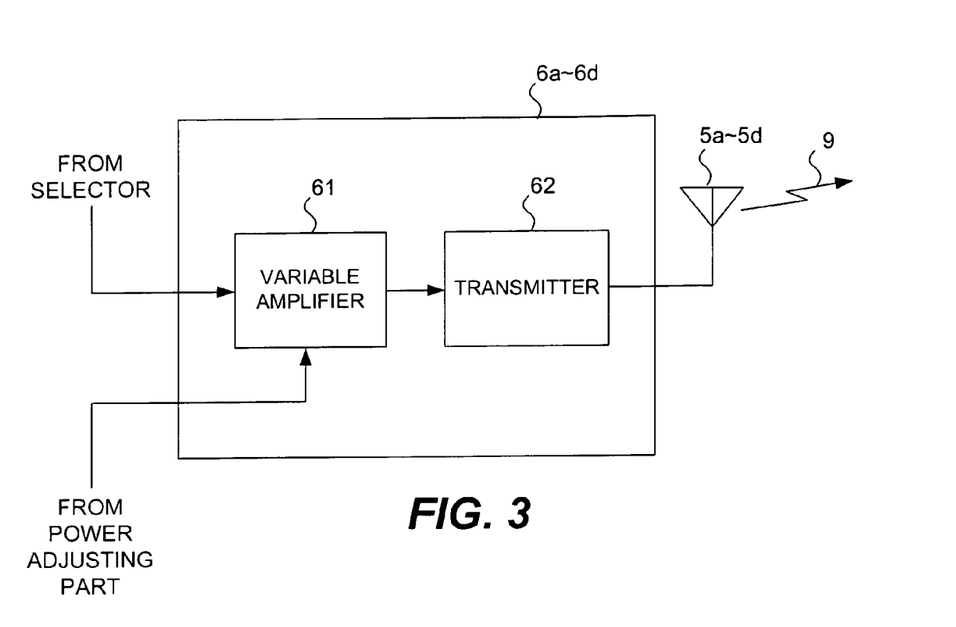
FIG. 3 is a block diagram of each of the transmission units of the transponder.

FIG. 3 is a block diagram of each of the transmission units 6a-6d for the transponders 3 (3FL, 3FR, 3RL and 3RR), comprising a variable amplifier 61 for the variable amplification of the interrogation signal 9 outputted from the selector 90 of interrogator 8 and a transmitter 62 for transmitting the amplified interrogation signal 9 from the variable amplifier 61 through the corresponding one of the transmission antennas 5a-5d on the aforementioned low-frequency signal in the low-frequency band (such as the 125 kHz band).

One of the structural characteristics of the transmission units 6a-6d is that the transmission power of the interrogation signal 9 transmitted through the transmission antennas 5a-5d can be varied according to a command signal from the power adjusting part 89 of the interrogator 8. According to the illustrated example, the transmission power of the interrogation signal 9 is changed by varying the amplification gain of the variable amplifier 61 but this is not intended to limit the scope of the invention. What is important is that the transmission power of the interrogation signal 9 transmitted through the transmission antennas 5a and 5d should be variable. This may be accomplished by increasing and decreasing the source voltage of the transmitter 62 according to a command signal from the power adjusting part 89. In such a situation, the variable amplifier 61 is not essential.

When a response signal 10 which is over the aforementioned lowest reception level for normal demodulation by the demodulator 85 of the interrogator 8 is received, its level judging part 86 judges that a response signal has been received. If not, it judges that a response signal has not been received. A signal indicative of the result of its judgment is outputted to the control part 87 of the interrogator 8. In the case of a judgment of reception, the control part 87 not only generates output data on the basis of the demodulated data of this response signal 10 (such as the tire pressure data detected by the sensor part 34 of the transponder 3 as well as the ID data of the transponder 3) and outputs such output data to the output device 88 of the interrogator 8 but also carries out the following characteristic process to be explained below.

Figures 4, 6:
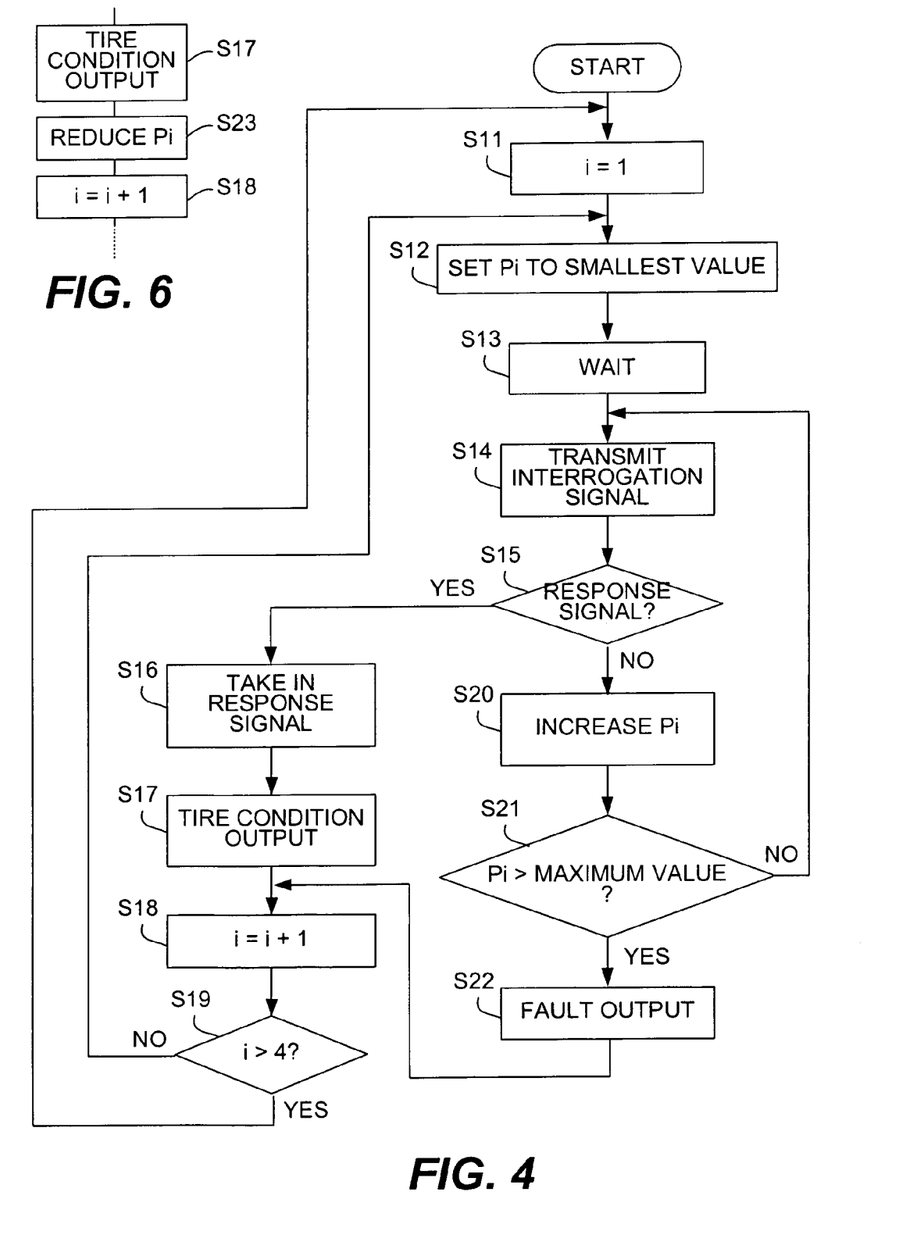
FIG. 4 is a flowchart of an operation program carried out by the control part of the interrogator.
FIG. 6 is a portion of the flowchart of FIG. 4 modified as a variation.

FIG. 4 is a flowchart of the operation program carried out by the control part 87 of the interrogator 8. This operation program is started when power is supplied from the vehicle 4 to the interrogator 8 (or when the ignition key is switched on). Firstly, a dummy index i of the transponder 3 is set to its initial value "1" (Step S11) and the transmission power $P_i$ (specified power value to the ith transponder 3) is set to a smallest value (Step S12). For the convenience of explanation, the transponders 3FL, 3FR, 3RL and 3RR are respectively defined as the first, second, third and fourth transponders.

Accordingly, the specified power value when $P_i=P_1$ is the value for the transmission unit 6a paired with the transponder 3FL for the left-hand front tire, the specified power value when $P_i=P_2$ is the value for the transmission unit 6b paired with the transponder 3FR for the right-hand front tire, the specified power value when $P_i=P_3$ is the value for the transmission unit 6c paired with the transponder 3RL for the left-hand rear tire, and the specified power value when $P_i=P_4$ is the value for the transmission unit 6d paired with the transponder 3RR for the right-hand rear tire, In the above, the smallest value to which a specified power value is to be set means the smallest transmission power value with which the transponder 9 can be started up after an interrogation signal is transmitted once or at most a few times if the transmission antennas 5a-5d and their corresponding transponders 3 are in an ideal relationship (no transmission problems due to deteriorations in characteristics or pollutions).

After transmission power value $P_1$ is set to this smallest value, there is a wait period of a specified duration (Step S13) corresponding to the intermittent operations of the transponder 3. If the tire data are to be collected frequently, this wait period is made shorter. If the consumption rate of the internal batteries 37 is to be reduced, this wait period is made longer. Alternatively, this wait period may be made variable, according to the travel condition of the vehicle 4. For example, the wait period is made longer while the vehicle 4 is stopped and the wait period is made shorter, depending on the running speed of the vehicle 4 so as to increase the density of data collection.

After this wait period has elapsed, an interrogation signal 9 is transmitted (Step S14) at the power value ($P_1$) set in Step S12, that is, the aforementioned smallest value.

Next, the reception of a response signal from the transponder 3 is judged (Step S15). Since the smallest transmission power value of the interrogation signal 9 is such that the transponder 9 can be started up after one or at most a few transmissions of the interrogation signal, as explained above, the current power value $P_i$ (now $P_1$) is increased by a specified amount (Step S20) if it is determined at this time that there was no normal reception of a response signal (NO in Step S15). After the power value is thus increased, it is determined whether the increased power value has exceeded an allowable maximum value (Step S21).

In the above, the allowable maximum value is a value determined by the law. The aforementioned "specified amount" by which the current power value $P_i$ is increased may be determined by dividing the difference between the smallest value and this maximum value by an integral number of steps. If the power value is thus increased by one step, the increased power value will be below the allowable maximum value (NO in Step S21) and the routine is repeated from Step S14.

When it is judged that a response signal 10 has been normally received (YES in Step S15), the normally received response signal 10 is taken in (Step S16) and, after an output process is carried out such as regarding the tire condition (Step S17), the dummy index i is incremented by 1 (Step S18). If the incremented dummy index has not exceeded 4 (NO in Step 19), this means that not all four transponders 3 have been checked yet and hence the routine is repeated from Step S12. If all four transponders 3 have been checked (YES in Step S19), the routine is repeated from Step S11.

In the above, if the transmission power value $P_i$ is found to exceed the maximum allowable value in Step S21, this means that no response signal is received even after the transmission power value $P_i$ is increased to the maximum allowable value and hence a specified fault output is transmitted (Step S22) before the routine proceeds to Step S18. This is probably due to a failure of the battery 37 or an abnormal condition of a transmission antenna 5 or a transmission unit 6 and an output is made to this effect such that a repair work may be carried out.

Figure 5:
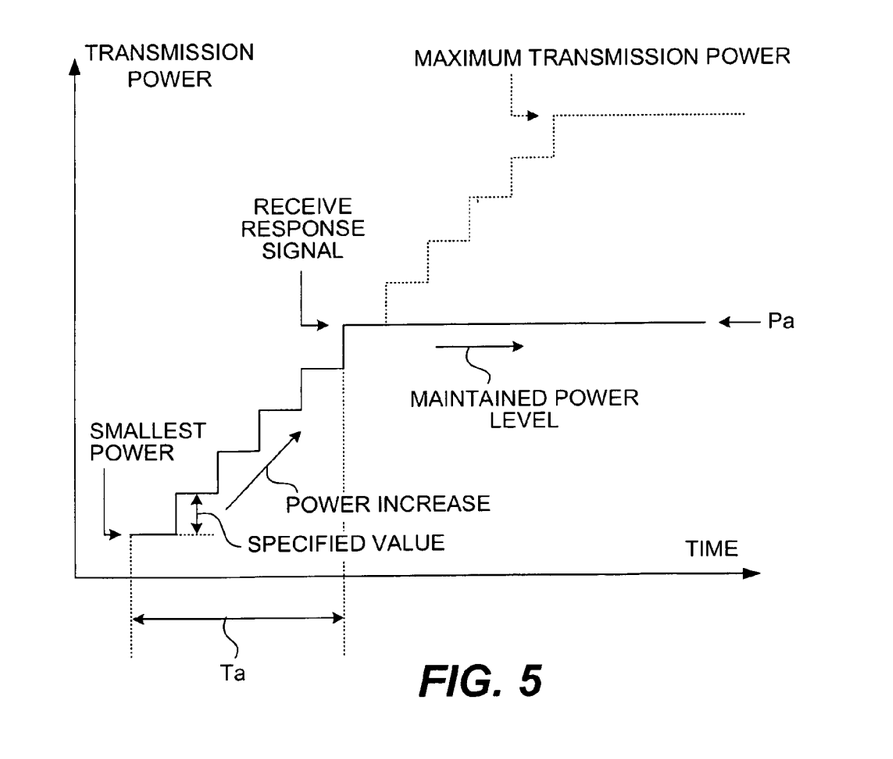
FIG. 5 is a diagram for showing an example of how the transmission power value may change as a result of carrying out the process shown by the flowchart of FIG. 4.

FIG. 5 is a diagram for showing an example of how the transmission power value may change as a result of carrying out the process shown by the flowchart of FIG. 4. In this diagram, the vertical axis indicates the magnitude of the transmission power of the interrogating signals 9 transmitted from the transmission antennas 5a-5d and the horizontal axis indicates the time.

Immediately after the start of the process shown in the flowchart of FIG. 4, the transmission power of the interrogation signal 9 from the transmission antennas 5a-5d is of the smallest value. Let us assume that the magnitude of the transmission power of the interrogation signal 9 necessary to start up the transponder 3 happens to be Pa as indicated in FIG. 5. This means that for a certain period of time Ta after the flowchart of FIG. 4 is started, the transponder 3 is not started up and no response signal 10 is received from the transponder 3. During this period of time, the transmission power is increased repeatedly and it finally reaches the level of Pa after several cycles of the steps of the flowchart.

After the time period of Ta has elapsed, the magnitude of the transmission power of the interrogation signal 9 is maintained at the level of Pa. Since Pa represents an optimum level of transmission power autonomously determined by the positional relationship of the transmission antennas 5a-5d with the transponders 3, their transmission and reception characteristics, the pollution conditions of the environment, etc., the power adjustment can be automated at the time of setting the tire pressure monitoring system 1 onto the vehicle 4.

As a result, the manual setting work may be obviated and the work cost can be significantly reduced. Since the automatic setting work can take into account the difference among the vehicle types, tire pressure monitoring systems that are common to different kinds of vehicles may be provided and the production cost can be reduced even from this point of view.

Moreover, since a system of this illustrated kind can be realized without changing the structure of the passive transponders 3, the advantage of passive transponders can be fully utilized, that is, it is started up only in response to an interrogation signal and hence the power consumption can be reduced.

It goes without saying that the invention is not limited to the example illustrated above and many variations are possible within the scope of this invention.

FIG. 6 is a flowchart of a part of one of such variations, showing how a portion of the flowchart of FIG. 4 may be modified. In this variation, the step of reducing the transmission power $P_i$ by a specified amount (Step S23) is inserted between Steps S17 and S18 of the flowchart of FIG. 4.

Figure 7:
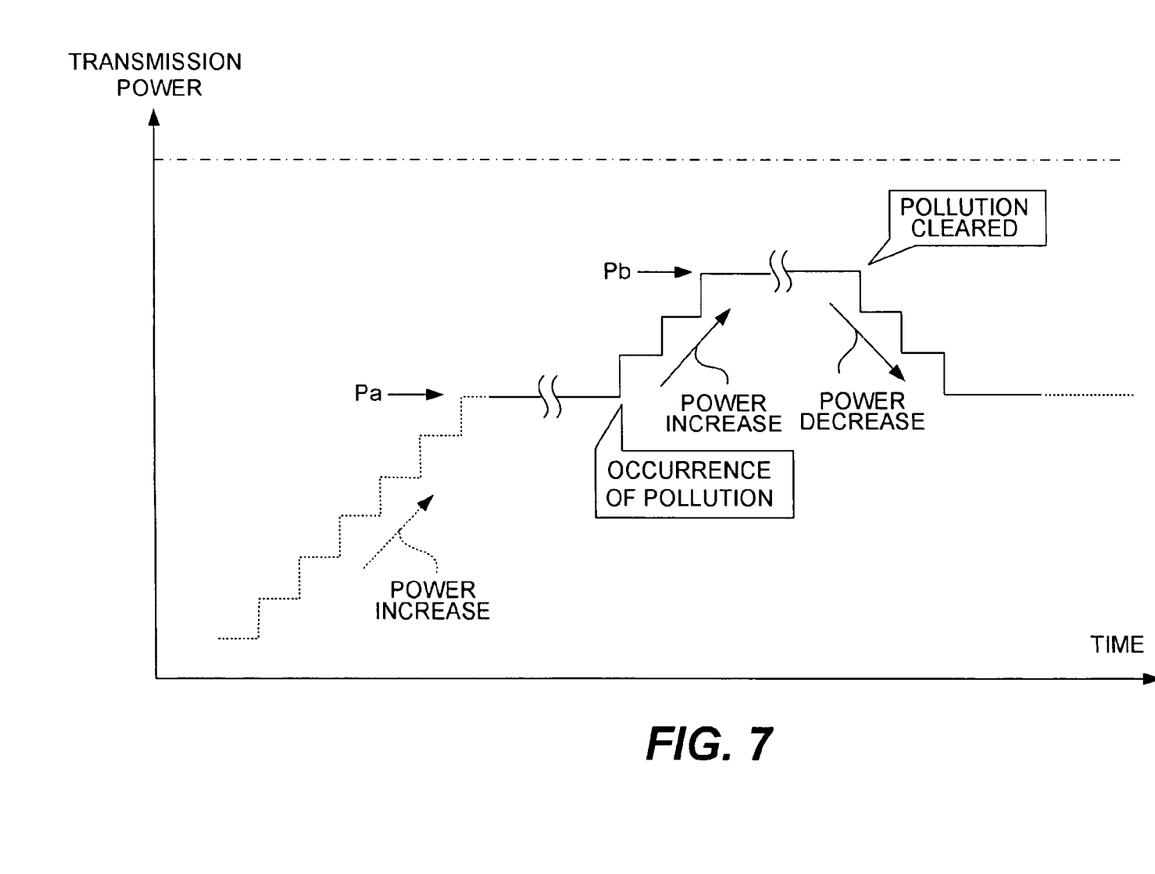
FIG. 7 is a diagram for showing an example of the change in the transmission power when the process shown by the flowchart of FIG. 6 is carried out.

FIG. 7 is a diagram for showing an example of how the transmission power value may change as a result of carrying out the process shown by the flowchart of FIG. 6. In this diagram, as in the diagram shown in FIG. 5, the vertical axis indicates the magnitude of the transmission power of the interrogation signals 9 transmitted from the transmission antennas 5a-5d and the horizontal axis indicates the time. In FIG. 7, too, Pa indicates the magnitude of the transmission power of the interrogation signal 9 necessary to start up the transponder 3. Suppose now that a communication trouble occurs while the vehicle 4 is traveling with the transmission power level set at Pa, say, because of splashed dirt such that the necessary magnitude of the transmission power of the interrogation signal 9 for the startup increases from Pa to Pb. If this occurs, the magnitude of the transmission power is further increased monotonically step by step by operations according to the flowchart of FIG. 4. When it finally reaches the level of Pb, this level is maintained. The cause of the pollution may become removed in the meantime, however, say, by the vibrations of the traveling vehicle. According to the flowchart of FIG. 4, the transmission power of the interrogation signal 9 will remain at the increased level unless the ignition key is turned off. According to the variation shown in FIG. 6 with Step S23 inserted between Steps S17 and S18, the transmission power $P_i$ can be reduced as well as increased. Thus, if the cause of the pollution is removed, as shown in FIG. 7, the transmission power can be reduced back to the former level of Pa and the wasteful consumption of power can be avoided.

In the above example and variation, the transmission power $P_i$ is invariably started out from the "smallest" value. This means that the optimum level of transmission power cannot be reached until a certain length of time elapses, as indicated by Ta in FIG. 5 and hence that there is a room for improvement.

Figures 8, 9:
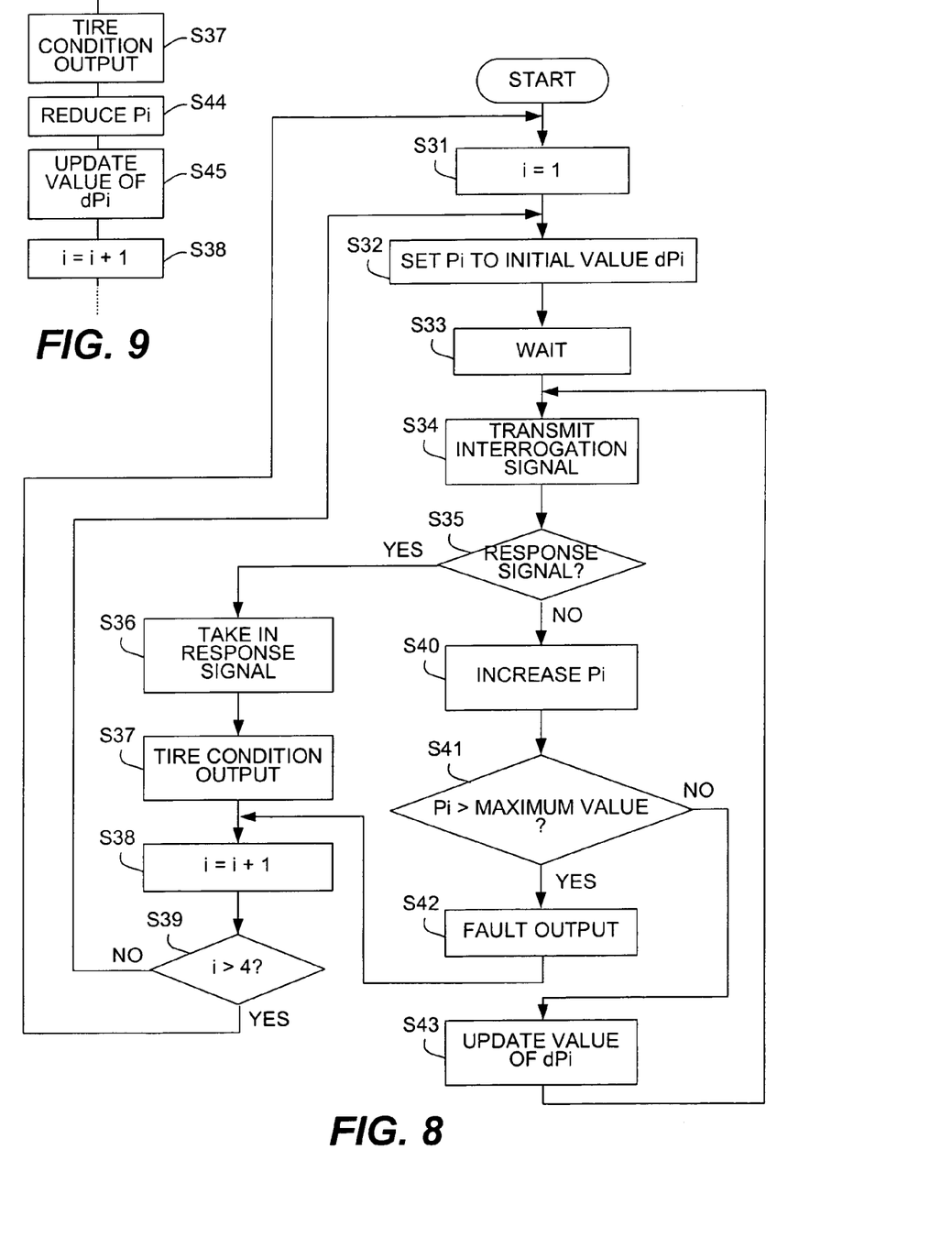
FIG. 8 is a flowchart incorporating an improvement over that of FIG. 4.
FIG. 9 is a portion of the flowchart of FIG. 8 modified as another variation.

FIG. 8 shows a flowchart improved in view of the above. This flowchart also starts as power begins to be supplied to the interrogator 8 from the vehicle 4 (that is, when the ignition key is switched on). As this flowchart is started, the dummy index i of the transponder 3 is set to its initial value 1 (Step S31) and the transmission power value $P_i$ is set to its initial value $dP_i$ (Step S32).

This initial power value $dP_i$ is a variable to be used in the place of the smallest power value in the flowchart of FIG. 4. Its value is the same as the smallest value in the flowchart of FIG. 4 but its value is updated sequentially as subsequent steps are carried out and this updated value is stored in a non-volatile memory element (such as a rewritable non-volatile memory or a volatile memory with a battery backup) such that its content is maintained even after the ignition key of the vehicle is switched off.

After the transmission power P1 is set to the initial value dP1, the routine waits for a specified length of time (Step S33) and an interrogation signal 9 is transmitted (Step S34) with the transmission power $dP_1$ which is equal to the aforementioned smallest value.

Next, the reception of a response signal from the transponder 3 is judged (Step S35). Since the smallest transmission power value of the interrogation signal 9 is such that the transponder 9 can be started up after one or at most a few transmissions of the interrogation signal, as explained above, the current power value $P_i$ (now $P_1$) is increased by a specified amount (Step S40) if it is determined at this time that there was no normal reception of a response signal (NO in Step S35). After the power value is thus increased, it is determined whether the increased power value has exceeded an allowable maximum value (Step S41).

In the above, the allowable maximum value is a value determined by the law. The aforementioned "specified amount" by which the current power value $P_i$ is increased may be determined by dividing the difference between the smallest value and this maximum value by an integral number n of steps. If the power value is thus increased by one step, the increased power value will be below the allowable maximum value (NO in Step S41) and the routine is repeated from Step S34 as in the case of the flowchart of FIG. 4. In the present case, however, this is done after the initial transmission power value dP1 is updated to the value equal to the smallest value plus the value of one step (that is 1/n of the difference between the maximum allowed value and the smallest value) (Step S43). The effect of this step will be explained in detail below.

If it is judged that a response signal 10 has been normally received (YES in Step S35) when the interrogation signal 9 was transmitted with transmission power equal to the smallest value plus the value of one step, the normally received response signal 10 is taken in (Step S36) and, after an output process is carried out such as regarding the tire condition (Step S37), the dummy index i is incremented by 1 (Step S38). If the incremented dummy index has not exceeded 4 (NO in Step 39), this means that not all four transponders 3 have been checked yet and hence the routine is repeated from Step S32. If all four transponders 3 have been checked (YES in Step S39), the routine is repeated from Step S31.

According to the flowchart of FIG. 8, too, if the transmission power value $P_i$ is found to exceed the maximum allowable value in Step S41, this means that no response signal is received even after the transmission power value $P_i$ is increased to the maximum allowable value and hence a specified fault output is transmitted (Step S42) before the routine proceeds to Step S38. This is probably due to a failure of the battery 37 or an abnormal condition of a transmission antenna 5 or a transmission unit 6 and an output is made to this effect such that a repair work may be carried out.

As the flowchart of FIG. 4 could be improved according to FIG. 6, the flowchart of FIG. 8 can be improved similarly by modifying Steps 37 and S38 of FIG. 8 by inserting therebetween the step of reducing the transmission power $P_i$ by a specified amount (Step S44) and the step of updating the initial value $dP_i$ with this reduced transmission power value (Step S45), as shown in FIG. 9.

Figure 10:
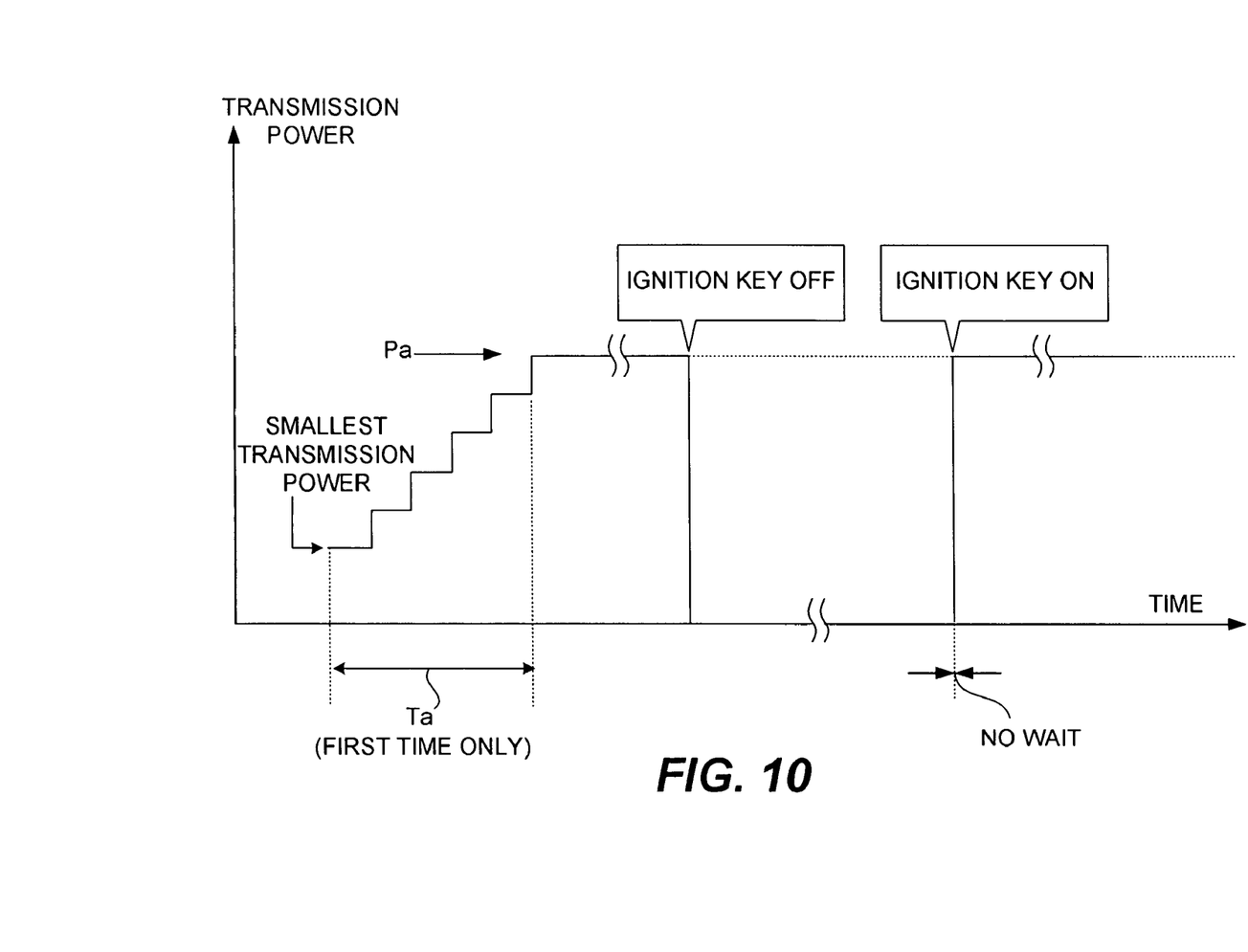
FIG. 10 is a diagram for showing an example of the change in the transmission power when the process shown by the flowchart of FIG. 8 is carried out.

FIG. 10 is a diagram for showing an example of how the transmission power value may change as a result of carrying out the process shown by the flowchart of FIG. 8. In this diagram, too, the vertical axis indicates the magnitude of the transmission power of the interrogating signals 9 transmitted from the transmission antennas 5a-5d and the horizontal axis indicates the time. If the flowchart is started immediately after the tire pressure monitoring system 1 is installed to the vehicle 4, the interrogation signals 9 are transmitted through the transmission antennas 5a-5d with transmission power equal to the smallest value because it is this smallest value that is set as the initial value $dP_i$.

If Pa indicates the magnitude of the transmission power of the interrogation signal 9 necessary to start up the transponder 3, the transponder 3 will not start up for some time (Ta) after the start of the flowchart of FIG. 8 and no response signal 10 will be received from the transponder 3. In the meantime, as shown in FIG. 8, the transmission power of the interrogation signal 9 continues to be increased step by step until the level of Pa is reached and the transmission power is thereafter maintained at this level.

A unique consequence of this variation appears when the ignition key is switched off and then switched on again. Immediately after the ignition key is switched on again, the transmission power $P_i$ is immediately set to Pa without waiting for the period of Ta because the initial value $dP_i$ of the transmission power $P_i$ is a variable stored in a non-volatile memory element (such as a rewritable non-volatile memory or a volatile memory with a battery backup) capable of holding its content even after the ignition key of the vehicle 4 is switched off and the relationship $P_i=Pa$ obtained during the run immediately before is stored in the form of $dP_i=Pa$.

Thus, according to this variation example, the previous value of the transmission power $P_i$ can be maintained every time the flowchart is started except when the flowchart is started for the first time. As a result, the useless wait time (of Ta) can be eliminated and the transmission power can be set to an optimum value immediately.

As explained above, the dummy index i of the transmission power $P_i$ indicates the transponder of each tire. The first transponder (i=1) is the one indicated as 3FL before for the left-hand front tire 2FL, the second (i=2) being the one indicated as 3FR before for the right-hand front tire 2FR, the third (i=3) being the one indicated as 3RL before for the left-hand rear tire 2RL and the fourth (i=4) being the one indicated as 3RR before for the right-hand rear tire 2RR. Thus, transmission power P1 relates to the transponder 3FL, transmission power P2 relates to the transponder 3FR, transmission power P3 relates to the transponder 3RL and transmission power P4 relates to the transponder 3RR.

Thus, as the dummy index i in incremented by 1, the initial transmission power values $dP_1$, $dP_2$, $dP_3$ and $dP_4$ are sequentially set for the four transponders 3FL, 3FR, 3RL and 3RR. For example, let "A" be the transmission power value necessary for starting up the transponder 3FL for the left-hand front tire 2FL, "B" be the transmission power value necessary for starting up the transponder 3FR for the right-hand front tire 2FR, "C" be the transmission power value necessary for starting up the transponder 3RL for the left-hand rear tire 2RL and "D" be the transmission power value necessary for starting up the transponder 3RR for the right-hand rear tire 2RR. In this case, the initial values for the transmission power values for these transponders 3 for the next time will be individually set as $P_1$="A", $P_2$="B", $P_3$="C" and $P_4$="D".

In summary, according to this variation example, appropriate initial values (P1, P2, P3 and P4) can be individually set in view of the different conditions (such as the levels of the electromagnetic waves and pollution and age) of the individual tires. Although it was explained in the examples above that the presence or absence of a response signal is judged on the basis of the reception level, the invention is not intended to be limited by this manner of detection.

Figure 11A:
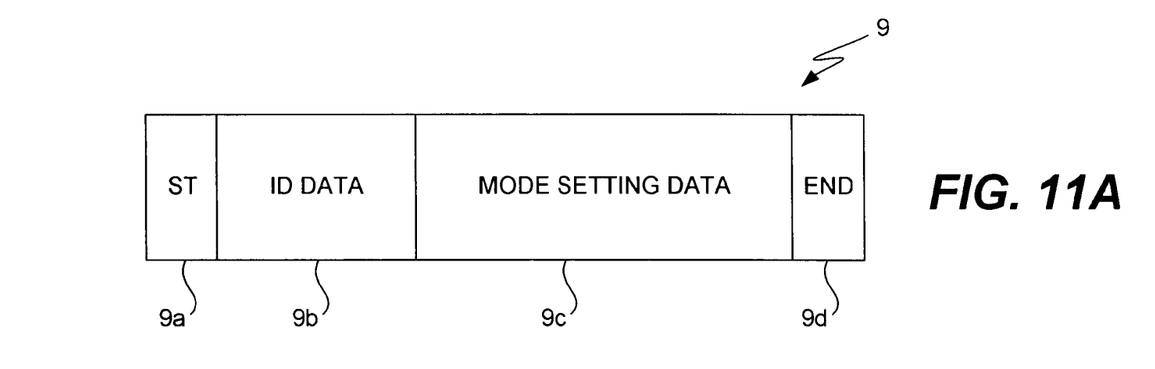
FIGS. 11A and 11B, together referred to as FIG. 11 are drawings for showing the signal format of an interrogation signal and a response signal, respectively.

FIG. 11 shows the format of an interrogation signal 9 and a response signal 10. As shown in FIG. 11A, the interrogation signal 9 may be structured with a start (ST) part 9a, an ID data part 9b, a mode setting data part 9c and an end part 9d. With such a structure, only a specified transponder 3 can be dependably started up by matching with the individual ID data stored in the ID data part. The operation mode of the transponder 3 can be set freely by the mode setting data (such as "wake-up" mode setting data) stored in the mode setting data part 9c. If the interrogation signal 9 is intended to be used only for the startup of the transponder 3, it may be formed as a simple signal (without containing any meaningful data) only with a carrier wave signal with a specified frequency (in the aforementioned "low" frequency band).

Figure 11B:
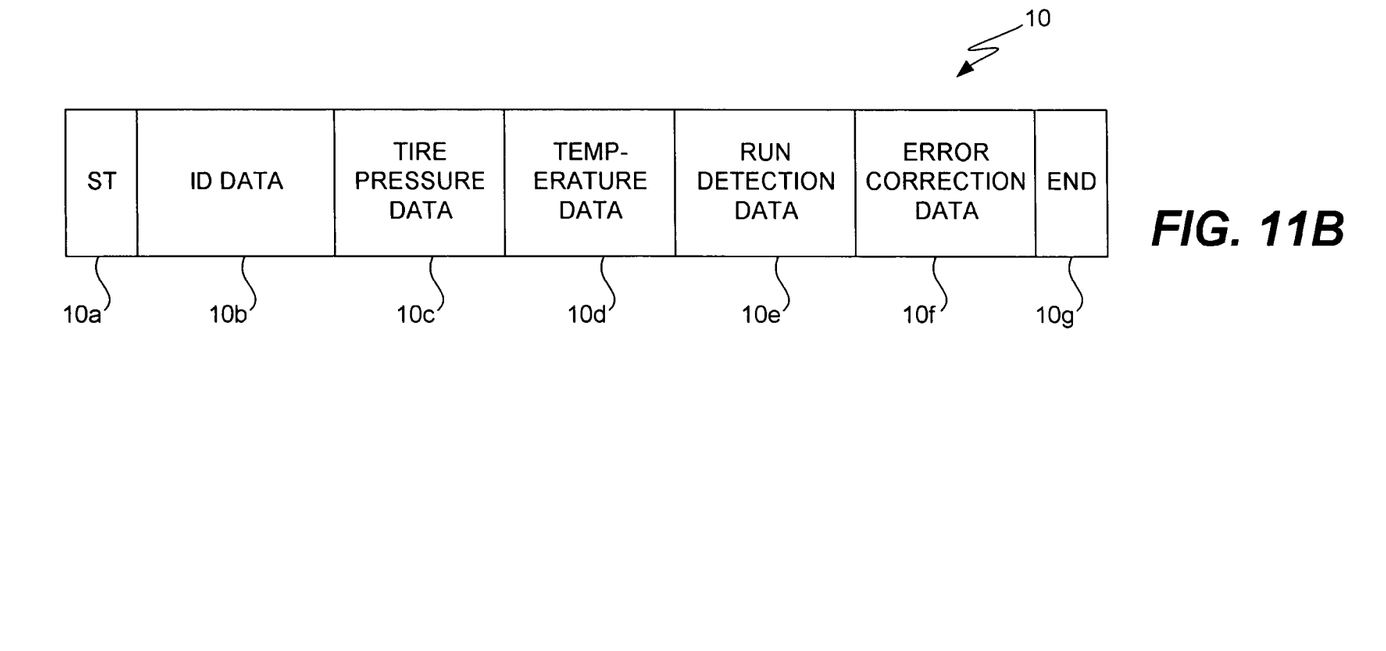

As shown in FIG. 11B, the response signal 10 may be structured with a start (ST) part 10a, an ID data part 10b, a tire pressure data part 10c, a temperature data part 10d, a run detection data part 10e, an error correction data part 10f and an end part 10g. The ID data part 10b stores the ID data of the transponder 3. The tire pressure data part 10c stores the tire pressure data detected by the sensor part 34. The temperature data part 10d stores the tire temperature data or the brake temperature data detected by the sensor part 34. The run detection data part 10e stores the tire rotation data detected by the sensor part 34. The error correction data part 10f stores various code data for making corrections in all these parts.

In the above, the error correction data are data that are provided for correcting bit errors that may occur in the ID data part 10b, the tire pressure data part 10c, the temperature data part 10d and the run detection data part 10e without exceeding a specified amount. The response signal 10 is normally received if there is no bit error at all. Even if there is a bit error but if it can be corrected by means of the error correction data, the response signal 10 will be received equally normally. The difference is merely that an error is corrected. In both situations, the response signal 10 is considered to have been received normally.

Thus, a judgment of normal reception of a response signal may not necessarily be based on the reception level of the response signal. A response signal may be considered to have been normally received even if there are some bit errors, as long as the response signals can be normally reproduced by means of error corrections. If there are too many bit errors to be handled by the error correction, a judgment of no reception of response signal may be given.

Next, some other preferable modifications of the invention will be described.

Firstly, the initial value of the transmission power may be obtained by calculations of a certain type. According to the example explained above with reference to FIG. 8, the transmission power $P_i$ is increased monotonically by a specified amount while saving this transmission power value $P_i$ as the initial value $dP_i$ and this initial value $dP_i$ is used for the next power transmission. If power was previously transmitted at 100 mW, for example, the initial transmission value for the next time of transmission will also be 100 mW. The invention need not be limited by this selection. The initial value for the next transmission power may be its multiple by a specified factor K.

If the factor K is chosen to be smaller than 1 such as K=0.9, the transmission power is effectively reduced from the previous time. It may be preferable from the point of view of power economy. If K is selected to be larger than 1 such as K=1.1, the transmission power is larger than the previous time and this may be preferable from the point of view of communication stability.

Secondly, the transmission power need not be increased by a specified constant amount. In the examples described above with reference to FIGS. 4 and 8, the transmission power of the interrogation signal 9 is increased by a specified constant amount (Steps S20 and S40) until a response signal 10 is received from the corresponding transponder 3. In the examples described above with reference to FIGS. 6 and 9, furthermore, the transmission power of the interrogation signal 9 is decreased monotonically by a specified amount (Steps S23 and S44) after the tire condition output is made. These changes, however, need not be uniformly. A large change may be made initially, followed by smaller changes.

Figure 12:
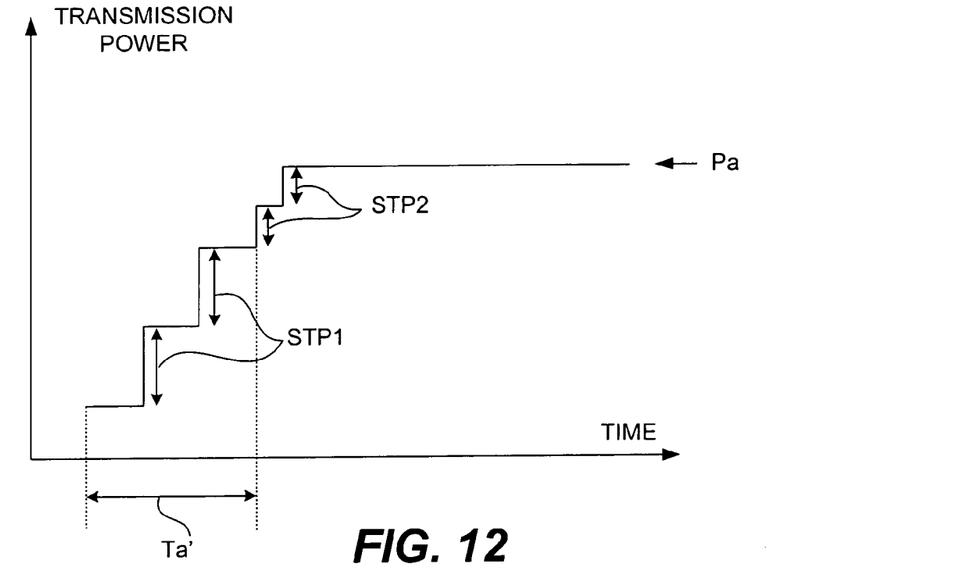
FIG. 12 is a diagram of the transmission power characteristic where the power increase is effected unevenly.

FIG. 12 shows an example where the transmission power is increased by unequal amounts. The transmission power of the interrogation signal 9 necessary for starting up the transponder 3 is again indicated as Pa, and the transmission power of the interrogation signal 9 is increased monotonically stepwise from an initial level to Pa. The number of the steps is 4. In this example, the first two steps STP1 are significantly larger than the last two steps STP2 such that the target level Pa can be reached more quickly and then fine adjustments can be carried out and hence that the time Ta' to actually start up the transponder 3 can be significantly reduced.

Figure 13:
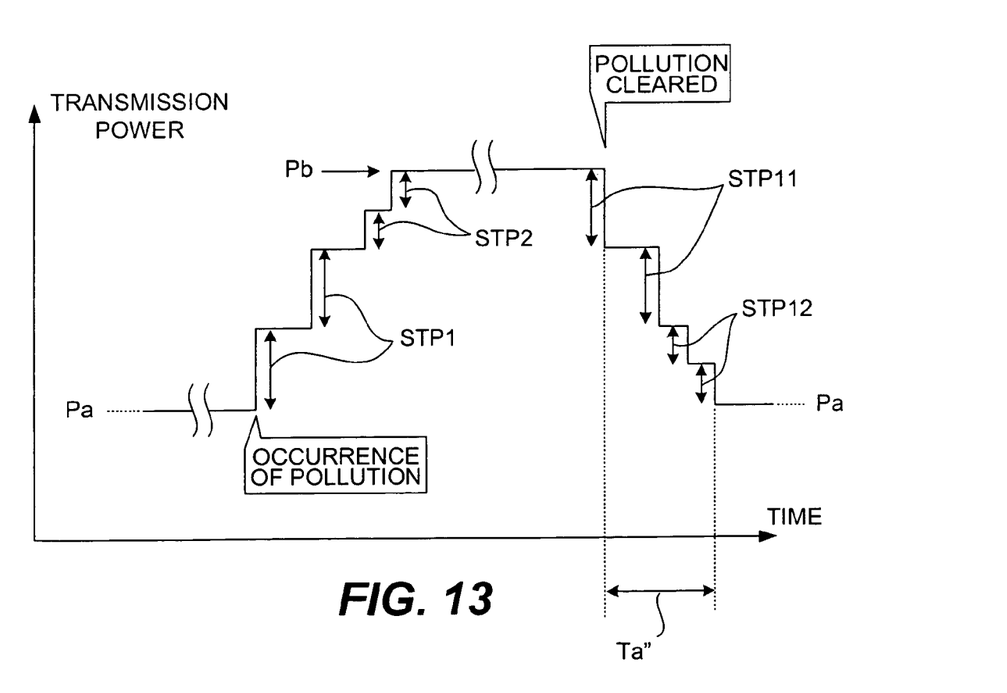
FIG. 13 is a diagram of the transmission power characteristic where the power increase and decrease are both effected unevenly.

FIG. 13 shows another example where the transmission power is both increased and decreased by unequal amounts. The transmission power is decreased also in four steps but the first two steps STP11 are significantly larger than the last two steps STP12 such that the transmission power is more quickly approached to the target level Pa and then fine adjustments are made with the smaller steps and hence the time Ta" required to return to the normal condition can be significantly reduced.

The changes may be made even more gradually either linearly or non-linearly. These variations are all based on the principle of making a large change quickly and subsequently making fine adjustments. By this variation, the time for response by the transponder 3 can be shortened by the large change in the transmission power and the fine adjustments can be done accurately by small changes.

Thirdly, the initial transmission power value may be varied among the tires or depending on the tire positions because there are frequently differences among the communication capabilities of the transponders 3 corresponding to the individual tires 2. Although a general statement cannot be made because there are differences among different vehicle types, for example, the communication capabilities of the transponders 3 for the rear tires are frequently inferior to those of the transponders 3 for the front tires. If such difference is taken into consideration, the "smallest" value for the transmission power $P_i$ should be set differently to be optimum for each of the individual tires. If it is assumed that the communication capabilities of the rear tires are inferior to those of the front tires by a certain percentage, the initial values ($P_3$ and $P_4$) of the transmission power for the transponders 3 for the rear wheels may be raised by the same percentage over those ($P_1$ and $P_2$) of the transmission power for the transponders 3 for the front wheels. In this manner, the number of wasteful transmissions of the interrogation signals 9 to the transponders 3 of the rear tires inferior in communication capability can be reduced.

If the initial values of transmission power are to be obtained by a calculation, the ideas presented above may be used in such a calculation.

What is claimed is:

1. A startup control method for a passive transponder adapted to be started up by receiving an interrogation signal and to return a requested response signal, said startup control method comprising the steps of:

judging presence or absence of a return of said response signal while monotonically increasing transmission power of said interrogation signal from an initial value;

reducing the amount of increase of said transmission power stepwise every time normal reception of said return is judged to be absent; and maintaining said transmission power, every time said return is judged to be present, at the value of said transmission power as of the time when presence of said return was judged.

2. The startup control method of claim 1 further comprising the step of monotonically reducing said transmission power of said interrogation signal if said return is judged to be present.

3. The startup control method of claim 1 wherein said initial value is a variable, said startup control method further comprising the step of updating said initial value with the value of the transmission power at the time when presence of said return is judged.

4. The startup control method of claim 1 wherein presence or absence of said return is judged based on reception level of said response signal.

5. The startup control method of claim 1 wherein presence or absence of said return is judged based on whether or not correction of error in said response signal was carried out normally by correcting said response signal by using an error correction data part contained in said response signal.

6. An interrogator for a tire pressure monitoring system that is used in pair with a passive transponder adapted to be started up by receiving an interrogation signal and to return a response signal that is requested and at least includes tire pressure data, said interrogator comprising:

an ignition key;

a judging part that judges presence or absence of a return of said response signal while monotonically increasing transmission power of said interrogation signal from an initial value by an amount which is made smaller stepwise every time said return is judged to be absent;

a maintaining part that maintains said transmission power, if said return is judged to be present by said judging part, at the value of said transmission power as of the time when presence of said return was judged;

an updating part that updates said initial value with the value of said transmission power as of the time when presence of said return was judged; and a memory part that stores said updated initial value even if said ignition key is switched off.

7. The interrogator of claim 6 wherein presence or absence of said return is judged based on reception level of said response signal.

8. The interrogator of claim 6 wherein presence or absence of said return is judged based on whether or not correction of error in said response signal was carried out normally by correcting said response signal by using an error correction data part contained in said response signal.

9. The interrogator of claim 6 wherein said initial value is set individually for each of tire positions.

10. An interrogator for a tire pressure monitoring system that is used in pair with a passive transponder adapted to be started up by receiving an interrogation signal and to return a response signal that is requested and at least includes tire pressure data, said interrogator comprising:
- an ignition key;
- a judging part that judges presence or absence of a return of said response signal while monotonically increasing transmission power of said interrogation signal from an initial value by an amount which is made smaller stepwise every time said return is judged to be absent;
- a power reducing part that reduces said transmission power stepwise if said return is judged to be present by said judging part;
- an updating part that updates said initial value with the value of said transmission power as of the time when presence of said return was judged; and
- a memory part that stores said updated initial value even if said ignition key is switched off.

11. The interrogator of claim 10 wherein presence or absence of said return is judged based on reception level of said response signal.

12. The interrogator of claim 10 wherein presence or absence of said return is judged based on whether or not correction of error in said response signal was carried out normally by correcting said response signal by using an error correction data part contained in said response signal.

13. The interrogator of claim 10 wherein said initial value is set individually for each of tire positions.

* * * * *